United States Patent [19]

Schuhmacher

[11] 3,926,996
[45] Dec. 16, 1975

[54] PRODUCTION OF ANTHRAQUINONEOXAZOLES

[75] Inventor: Alfred Schuhmacher, Ludwigshafen, Germany

[73] Assignee: BASF Aktiengesellschaft, Ludwigshafen (Rhine), Germany

[22] Filed: Nov. 30, 1973

[21] Appl. No.: 420,702

[30] Foreign Application Priority Data
Dec. 4, 1972 Germany..................... 2259329

[52] U.S. Cl. ... 260/256.4 Q; 260/307 A; 260/307.5; 260/515 A; 260/518 R; 260/520; 8/39
[51] Int. Cl.² ................................. C07D 263/62
[58] Field of Search ................ 260/307.5, 256.4 Q

[56] References Cited
UNITED STATES PATENTS

| | | | |
|---|---|---|---|
| 2,683,717 | 7/1954 | Nickels | 260/307.5 |
| 2,871,240 | 1/1959 | Randall et al. | 260/256.4 |
| 3,489,773 | 1/1970 | Neeff et al. | 260/329.2 |
| 3,655,638 | 4/1972 | Ulrich et al. | 260/153 |

*Primary Examiner*—Paul M. Coughlan, Jr.
*Assistant Examiner*—David E. Wheeler
*Attorney, Agent, or Firm*—Johnston, Keil, Thompson & Shurtleff

[57] ABSTRACT

Improvement in the process for the production of anthraquinoneoxazoles of the formula:

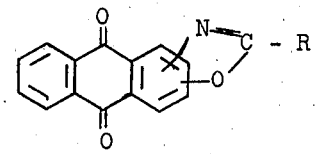

in which R is 1-anthraquinonyl, 2-anthraquinonyl or 1,9-anthrapyrimidyl-(2) which may bear amino, halogen, cyano or nitro as a substituent, by condensation of an o-haloacylaminoathraquinone of the formula:

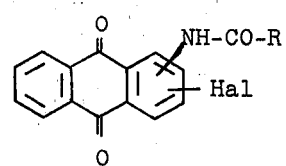

in which Hal is chloro or bromo in the presence of a salt of a weak acid with a strong base while heating. The improvement consists in carrying out the condensation in a water-miscible strongly polar aprotic solvent.

9 Claims, No Drawings

PRODUCTION OF ANTHRAQUINONEOXAZOLES

This invention relates to a process for the production of anthraquinoneoxazoles from o-haloacylaminoanthraquinone derivatives.

Anthraquinoneoxazoles are prepared by intramolecular condensation of o-hydroxyacylaminoanthraquinone or o-haloacylaminoanthraquinones. Thus anthraquinone- 2,3-d -(1-nitro-2-anthraquinonyl)-oxazole is formed from the reaction product of 2-amino-3-hydroxyanthraquinone and 1-nitroanthraquinone-2-carboxylic acid chloride (an o-hydroxyacylaminoanthraquinone derivative) in weak oleum (BIOS Report 987, page 15; FIAT Report 1313, II, page 158). This cyclization, which may also be referred to as condensation, may also be achieved in a high boiling solvent by means of an agent for eliminating water such as p-toluenesulfonic acid. Instead of 1-nitroanthraquinone 2-carboxylic acid chloride it is also possible to use any other acid chlorido in a similar manner, in order to synthesize anthraquinoneoxazoles of corresponding constitution (U.S. Pat. No. 2,683,717, Example 1).

Another method for the production of anthraquinoneoxazoles consists in reacting an o-aminohydroxyanthraquinone with an aldehyde (German Pat. No. 252,839). This method has not achieved any significance in practice because only simply aldehydes are easily accessible industrially.

All methods for the production of anthraquinoneoxazoles from o-aminohydroxyanthraquinones have the disadvantage that the latter can only be prepared with difficulty and by a very cumbersome method. Thus for example 2-amino-3-hydroxyanthraquinone which is a very important intermediate for the production of anthraquinone-2,3-oxazole vat dyes is prepared by way of the following reaction stages:

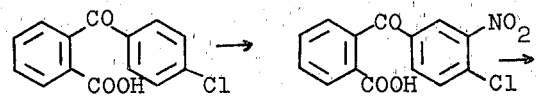

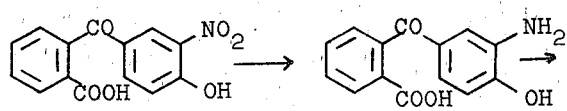

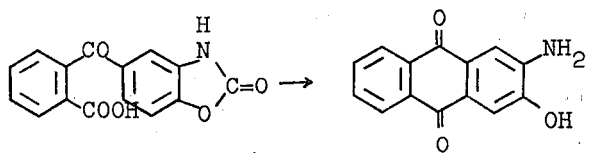

o-amino-haloanthraquinones are accessible much more readily and simply than o-aminohydroxyanthraquinones. The corresponding o-acylaminohaloanthraquinones are obtained therefrom with anthraquinone acid chlorides without difficulty. While being easy to produce, the o-acylaminohaloanthraquinones can only be converted under drastic conditions and with difficulty into the corresponding anthraquinoneoxazoles. Thus for example the acylamine from 1-amino-4-cyanoanthraquinone-2-carboxylic acid chloride and 2-amino-3-bromoanthraquinone is heated as described in French Pat. No. 941,456, Example 6 with a large amount of potassium acetate in the presence of copper acetate for 6 hours at 185° to 195°C in order to effect oxazole cyclization. The reaction product of 1,9-thiophenanthrone-2-carboxylic acid chloride with 2-amino-3-chloroanthraquinone has to be heated with 0.7 times the amount of anhydrous sodium carbonate in the presence of copper oxide for twelve hours in nitrobenzene at the boiling temperature in order for formation of the oxazole to take place (U.S. Pat. No. 2,683,717, Example 2). Anthraquinone-[2,3-d]-(1-amino-2'-anthraquinonyl)-oxazole is obtained according to the description in German Pat. No. 47,687 by treatment of the condensation product of 2-amino-3-bromoanthraquinone and 1-aminoanthraquinone-2-carboxylic acid chloride with anhydrous sodium carbonate in naphthalene in the presence of copper and copper acetate at 220°C.

The object of the present invention is to provide a method simple to handle and capable of being easily carried out industrially by which an anthraquinoneoxazole is obtained in a good yield and under mild reaction conditions from a readily accessible o-acylaminohaloanthraquinone.

We have found an improvement in the process for the production of anthraquinoneoxazoles of the formula:

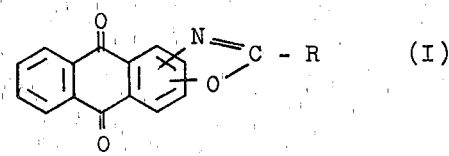

in which R is 1-anthraquinonyl 2-anthraquinonyl or 1,9-anthrapyrimidyl-2 which may bear amino, halogen, cyano or nitro as a substituent by condensation of an o-haloacylaminoanthraquinone of the formula:

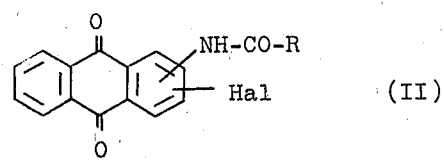

in which Hal is chloro or bromo and the substituents —NH—CO—R and —Hal are in the ortho-position to each other in the presence of a salt of a weak acid and a strong base, the said improvement consisting in carrying out the condensation in a water-miscible strongly polar aprotic solvent.

The process of the invention gives the desired anthraquinoneoxazole derivative of the formula (I) in a high yield and good purity so that as a rule the products do not have to be purified prior to further processing or use as dyes.

When the strongly polar water-miscible aprotic solvent is replaced by a solvent conventionally used for the reaction of anthraquinone derivatives such as nitrobenzene or o-dichlorobenzene, no oxazole formation takes place under the conditions of the process of the invention.

The process of the invention may be carried out conveniently by introducing the o-haloacylaminoanthraquinone derivative into a mixture of water-miscible strongly polar aprotic solvent and the salt of a weak acid with a strong base and then heating the mixture to the reaction temperature. The reaction temperature is as a rule from 100° to 170°C and preferably from 140° to 165°C. The end of the reaction may be monitored chromatographically by the disappearance of the o-haloacylaminoanthraquinone. The reaction temperature and the reaction period are determined first of all by the halogen and the acylaminogroup and secondly by the salt of the weak acid with the strong base. Generally the condensation is over after from 1 hour to 5 hours at a temperature of from 135° to 170°C. The condensation may also be carried out at a temperature higher than 170°C. Condensation at temperatures above 170°C is not attended by any advantage however because above 170°C there is no substantial acceleration of the reaction. Instead less pure products are obtained which have to be purified prior to further processing.

Examples of water-miscible strongly polar aprotic solvents for the process of the invention are the lower dialkylamides of aliphatic carboxylic acids such as N,N-dimethylformamide, N,N-diethylformamide, N,N-dimethylacetamide, N,N-diethylacetamide, N,N-dimethylpropionamide, N,N-diethylpropionamide; N-methyl compounds of cyclic lactams such as N-methylpyrrolidone or N-methylcaprolactam; tetraalkylureas such as N,N,N', N'-tetramethylurea; and aliphatic sulfoxides or sulfones such as dimethyl sulfoxide or tetramethylenesulfone, or mixtures thereof.

For the sake of economy the preferred solvents are: N,N-diemthylformamide, N-methylpyrrolidone, N,N-dimethylacetamide, dimethyl sulfoxide and mixtures of these. The amount of the water-soluble strongly polar aprotic solvent should be such that the reaction mixture is miscible before, during and after the reaction. It is convenient to use an amount of solvent which is from 1.5 to 6 times and preferably from twice to four times the amount of o-haloacylaminoanthraquinone. The use of more solvent offers no advantage. The condensation takes place in a high space-time yield because of the high concentration of the starting material in the reaction mixture.

Examples of salts of a weak acid and a strong base in whose presence the condensation takes place include alkali metal carbonates and alkaline earth metal carbonates such as sodium carbonate, potassium carbonate, calcium carbonate and also the alkali metal salts of carboxylic acids such as sodium and potassium salts of formic acid, acetic acid, propionic acid, benzoic acid or mixtures of these compounds.

The amount of the alkali metal salt should be at least one equivalent and is as a rule from one to two equivalents and preferably from 1.1 to 1.5 equivalents based on the o-haloacylaminoanthraquinone. The use of more than two equivalents of alkali metal salt per mole of o-haloacylaminoanthraquinone derivative does not result in any further advantage because the condensation is not accelerated more by a larger amount of the salt. The use of larger amounts of alkali salt has the drawback that a larger amount of solvent is necessary so that the reaction mixture should remain stirrable and miscible.

The o-haloacylaminoanthraquinones of the formula (II) necessary as starting materials are obtained by prior art methods, for example by acylation of o-haloaminoanthraquinone with an anthraquinonecarboxylic acid halide of the formula R—CO—Hal in a solvent which is inert under reaction conditions at elevated temperature.

1-chloro-2-aminoanthraquinone, 1-bromo-2-aminoanthraquinone, 2-amino-3-chloroanthraquinone, 2-amino-3-bromoanthraquinone, 1-amino-2,4-dichloroanthraquinone and 1-amino-2,4-dibromoanthraquinone are particularly suitable as o-aminohaloanthraquinones because of their industrial importance.

The bromides and particularly the chlorides of anthraquinone-1-carboxylic acid, anthraquinone-2-carboxylic acid and 1,9-anthrapyrimidine-2-carboxylic acid are suitable as acyl halides of the formula R—CO—Hal and in the anthraquinone carboxylic acids on which they are based one or two hydrogen atoms may be replaced by amino, nitro, cyano and/or halogen such as chloro or bromo.

Examples of compounds which are important for the production of dyes and are therefore preferred are: anthraquinone-1-carboxylic acid, anthraquinone-2-carboxylic acid, 1-aminoanthraquinone-2-carboxylic acid, 1-amino-4-nitroanthraquinone-2-carboxylic acid and 1,9-anthrapyrimidine-2-carboxylic acid.

In contrast to the prior art methods the process of the present invention makes possible the production of anthraquinoneoxazoles from o-haloacylaminoanthraquinones of the formula (II) by intramolecular condensation under fairly mild conditions. The oxazole derivatives are obtained in a high yield, good purity and at the same time in a high space-time yield.

As compared with the prior art methods starting from o-aminohydroxyanthraquinones the process of the present invention has the advantage that o-aminohaloanthraquinones are accessible from aminoanthraquinones in one reaction stage, while the o-aminohydroxyanthraquinones required as starting compounds for the prior art method have to be prepared by way of a number of reaction stages.

The following Examples will further illustrate the process of the invention. The parts and percentages specified are by weight.

EXAMPLE 1

35 Parts of anhydrous sodium carbonate is suspended in 100 parts of N,N-dimethylformamide and 35 parts of the condensation product from 2-amino-3-bromoanthraquinone and anthraquinone-2-carboxylic acid chloride is added. The reaction mixture is brought to 145°C in the course of one hour and stirred for five hours at 145°C. After having been cooled to ambient temperature the reaction product is suction filtered and washed with a small amount of dimethylformamide and then with water until neutral. After drying 27 parts of anthraquinone-[2,3-d]-[(2'-anthraquinonyl)-oxazole]is obtained as a yellow powder, equivalent to a yield of 90% of the calculated yield.

EXAMPLE 2

The procedure described in Example 1 is repeated but 100 parts of N-methylpryrrolidone is used instead of N,N-dimethylformamide. The same product is obtained in practically the same yield.

EXAMPLE 3

3 Parts of anydrous sodium carbonate (or 3 parts of potassium carbonate) is added at 80°C to 100 parts of dimethylacetamide and 33 parts of the reaction product of 2-amino-3-bromoanthraquinone with 1-amino-4-nitroanthraquinone-2-carboxylic acid chloride. After stirring for 8 hours at 135° to 140°C the whole is cooled to 60°C and the precipitate is suction filtered and processed as described in Example 1. 26.4 parts of anthraquinone-[2,3-d]-[(1'-amino-4'-nitro-2'-anthraquinonyl)-oxazole] is obtained, i.e. 80.0% of the calculated yield.

EXAMPLE 4

30 Parts of the condensation product of 1,9-anthrapyrimidine-2-carboxylic acid and 2-amino-3-chloroanthraquinone is added to 100 parts of dimethylacetamide and 3 parts of potassium carbonate. The reaction mixture is stirred for 1 hour at 165°C. The reaction product is filtered off at 60°C and processed as described in Example 1. After drying 24 parts of the corresponding 2,3-oxazole is obtained as a yellow crystalline powder, equivalent to 86.2% of the calculated yield.

EXAMPLE 5

40 parts of the reaction product from 1-chloro-2-aminoanthraquinone and 1-aminoanthraquinone-2-carboxylic acid chloride is introduced into 100 parts of dimethyl sulfoxide in which 6 parts of calcium carbonate is suspended. The whole is heated to 150°C and stirred at 150°C until the reaction has ended. After a reaction period of 4 hours the whole is suction filtered at 60°C and the filter cake is washed with methanol and dilute hydrochloric acid and dried. The yield is 33 parts of anthraquinonyl-[2,1-d]-[(2'-anthraquinonyl)-oxazole], corresponding to 88.7% of the calculated yield. It is a red powder.

The same product is obtained in a similar yield when 4 parts of sodium acetate is used instead of calcium carbonate.

EXAMPLE 6

30 parts of the condensation product of 1-amino-2,4-dichloroanthraquinone with anthraquinone-1-carboxylic acid chloride is suspended in 90 parts of tetramethylsulfone and 3 parts of potassium carbonate. The reaction mixture is heated to 165°C and stirred for 3 hours. It is suction filtered at 90°C and the filter cake is washed with methanol and then with water and dried. 22.9 parts of 4-chloroanthraquinone-[1,2,-d]-[(1'-anthraquinonyl)-oxazole] is obtained as a yellow powder. This is equivalent to 82.0% of the calculated yield.

EXAMPLE 7

6 Parts of anydrous sodium carbonate is suspended in 180 parts of N-methylpyrrolidone. 60 Parts of the reaction product of 2-amino-3-bromoanthraquinone with 1-aminoanthraquinone-2-carboxylic acid chloride is added at 80°C. The whole is stirred for 3 hours at 160°C, suction filtered at 60°C and the residue is washed with a small amount of N-methylpyrrolidone and then with water until devoid of salts and then dried. 44 Parts of anthraquinone-[2,3-d]-[(1'-amino-2'-anthraquinonyl)-oxazole] (C.I. Vat Red 10, C.I. No. 67,000) is obtained as a red powder. This is 86.4% of the calculated yield.

EXAMPLE 8

Comparative Experiments a. The procedure of Example 7 is followed but the N-methylpyrrolidone is replaced by nitrobenzene. 54 Parts of unchanged starting material is obtained (calculated: Br 14.5; found: Dr 14.3). There is no cyclization to oxazole.

b. There is no reaction when the amount of sodium carbonate is increased to 30 parts.

c. Again there is no reaction when 2 parts of a copper (I) salt (Ullmann catalyst) is also added.

No formation of dye can be observed even after the reaction mixture has been boiled for 3 hours.

I claim:

1. In a process for the production of an anthraquinoneoxazole of the formula:

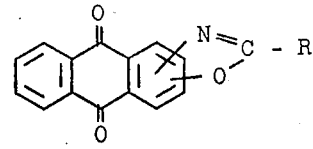

in which R is 1-amino-anthraquinonyl-(2), 1-amino-4-nitroanthraquinonyl-(2), 1-anthraquinonyl, 2-anthraquinonyl or 1,9-anthrapyrimidyl-(2), by condensation of an o-haloacylaminoanthraquinone of the formula

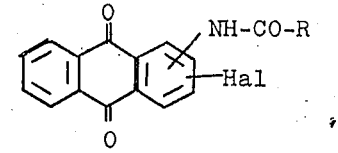

in which Hal is chloro or bromo and the substituents —NH—CO—R and Hal are in the ortho-position to one another, at elevated temperature and in the presence of a salt of a weak acid with a strong base, said salt being selected from the group consisting of alkali metal carbonate, alkaline earth metal carbonate and alkali metal salts of formic acid, acetic acid and benzoic acid, the improvement which comprises:

carrying out the condensation in a water-miscible polar aprotic solvent selected from the group consisting of N,N-dimethylformamide, N,N-dimethylacetamide, N,N-dimethylpropionamide, N,N-diethylformamide, N,N-diethylacetamide, N,N-diethylpropionamide, N-methylpyrrolidone, N-methylcaprolactam, dimethyl sulfoxide, tetramethylene sulfone, or N,N,N',N'-tetramethylurea.

2. A process as claimed in claim 1, wherein the water miscible polar aprotic soovent is N,N-dimethylformamide, N-methylpyrrolidone, N,N-dimethylacetamide, dimethyl sulfoxide or mixtures thereof.

3. A process as claimed in claim 1 wherein the amount of water-miscible polar aprotic solvent used is from twice to four times the amount of the o- haloacylaminoanthraquinone.

4. A process as claimed in claim 1, wherein the salt of a weak acid with a strong base is: sodium carbonate, potassium carbonate, calcium carbonate, sodium and potassium salts of formic acid, acetic acid, propionic acid, benzoic acid or mixtures of these compounds.

5. A process as claimed in claim 1 wherein at least one equivalent of said salt of a weak acid with a strong base is used for each mole of o-haloacylaminoanthraquinone.

6. A process as claimed in claim 5 wherein from one equivalent to two equivalents of said salt is used for each mole of o-haloacylaminoanthraquinone.

7. A process as claimed in claim 1 wherein the condensation is carried out at a temperature of from 100° to 170°C.

8. A process as claimed in claim 6, wherein the condensation is carried out at a temperature of from 100° to 170°C.

9. A process as claimed in claim 7 wherein the water-miscible strongly polar aprotic solvent used is: N,N-dimethylformamide, N-N-dimethylacetamide, N-methylpyrrolidone, dimethyl sulfoxide, or mixtures thereof.

* * * * *